United States Patent [19]
Naka et al.

[11] Patent Number: 5,361,103
[45] Date of Patent: Nov. 1, 1994

[54] LUMINANCE SIGNAL AND CHROMINANCE SIGNAL SEPARATING CIRCUIT

[75] Inventors: Hideyuki Naka; Hisakazu Hitomi, both of Kanagawa, Japan

[73] Assignee: Kabushiki Kaisha Toshiba, Kawasaki, Japan

[21] Appl. No.: 836,856

[22] Filed: Feb. 19, 1992

[30] Foreign Application Priority Data

Feb. 19, 1991 [JP] Japan .................. 3-024827

[51] Int. Cl.⁵ .................................... H04N 9/78
[52] U.S. Cl. ............................ 348/663; 348/665
[58] Field of Search .......... 358/31; 348/663, 665, 348/668, 666; H04N 9/78

[56] References Cited

U.S. PATENT DOCUMENTS

| | | | |
|---|---|---|---|
| 4,851,898 | 7/1989 | Asahara | 358/31 |
| 4,980,737 | 12/1990 | Umezawa | 358/31 |
| 5,051,818 | 9/1991 | Mishima | 358/31 |
| 5,099,315 | 3/1992 | Koga et al. | 358/31 |
| 5,146,317 | 9/1992 | Ishizu et al. | 358/31 |

FOREIGN PATENT DOCUMENTS

| | | | |
|---|---|---|---|
| 2183615 | 7/1990 | Japan . | |
| 262789 | 10/1990 | Japan | H04N 9/78 |

*Primary Examiner*—James J. Groody
*Assistant Examiner*—Glenton B. Burgess
*Attorney, Agent, or Firm*—Cushman, Darby & Cushman

[57] ABSTRACT

The luminance signal-color signal separating circuit obtains signals of three lines by a 1H delaying circuit. Further, by unit delaying circuits, signals at three points are obtained in each line. Thus, signals at nine points continued vertically and horizontally are input into a color signal detecting circuit which determines an oblique correlation of the signals at these nine points to thereby obtain the degree of the color. The color signal detecting circuit obtains a color signal output having had the oblique luminance component removed by the operation of the color signal component from a three-line color separating circuit and the degree of the color.

7 Claims, 9 Drawing Sheets

LUMINANCE SIGNAL AND CHROMINANCE SIGNAL SEPARATING CIRCUIT

BACKGROUND OF THE INVENTION

1. Field of the Invention

This invention relates to a luminance signal-color signal separating circuit for color television receivers and the like.

2. Description of the Related Art

Figure 13:
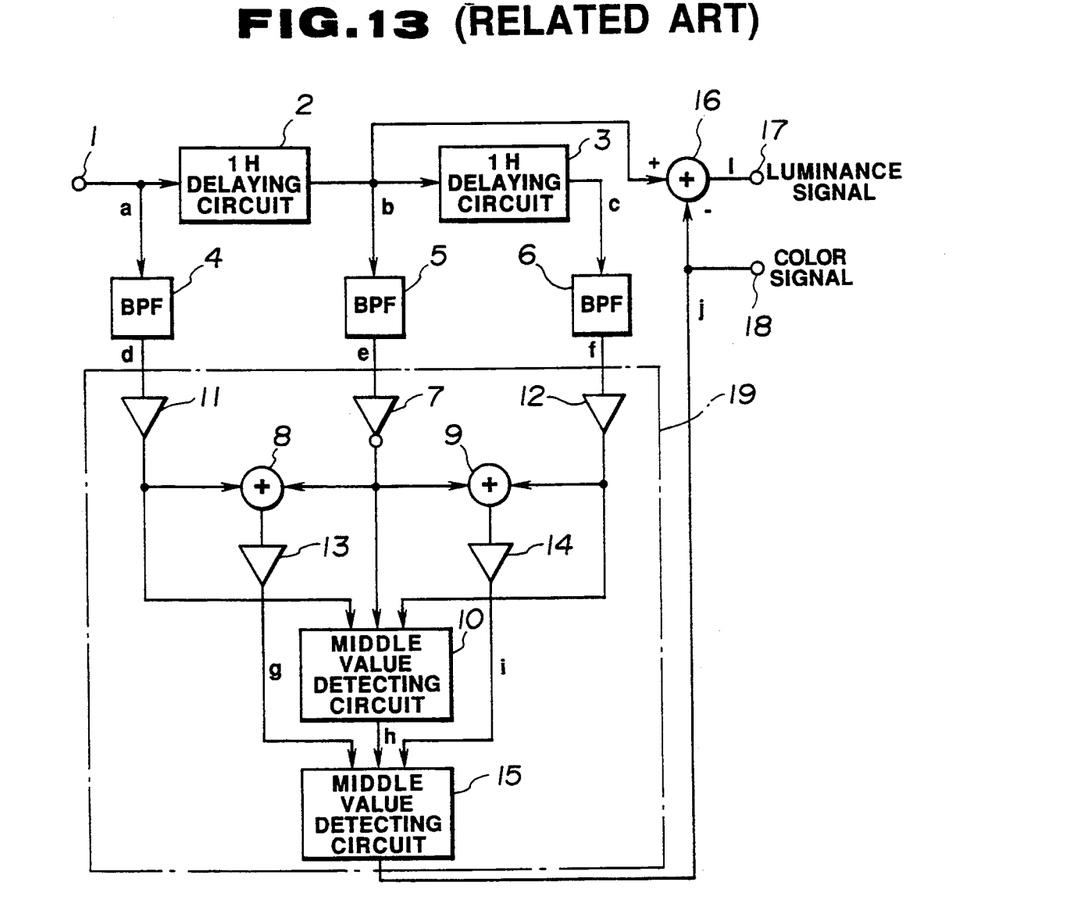
FIG. 13 is a block diagram showing a conventional luminance signal-color signal separating circuit.

FIG. 13 is a block diagram showing a related art of a luminance signal-color signal separating circuit.

A composite video signal input through an input terminal 1 is delayed by 1H (H represents a horizontal period) in a 1H delaying circuit 2 and is further delayed by 1H in a 1H delaying circuit 3. Thus, the present signal a, 1H delayed signal b and 2H delayed signal c are given respectively to band pass filters (mentioned as BPF's hereinafter) 4, 5 and 6. The BPF's 4, 5 and 6 pass signal components of the frequency band (3.58 MHz band) near the color subcarrier frequency among the signals input into the BPF's 4, 5 and 6. The signals d and f having passed through the BPF's 4 and 6 are given respectively to amplifiers 11 and 12. The signal e having passed through the BPF 5 is inverted in the polarity by an inverting amplifier 7. The outputs of these amplifier 11, inverting amplifier 7 and amplifier 12 are given to a middle value detecting circuit 10.

Figure 16:
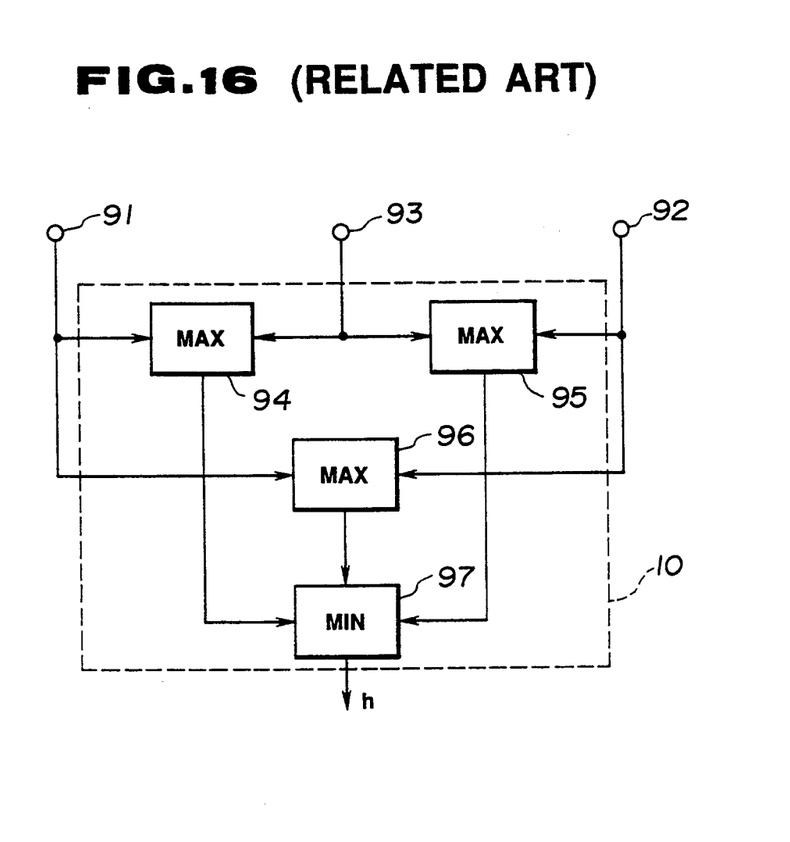
FIG. 16 is a block diagram showing a concrete formation of a middle value detecting circuit.

FIG. 16 is a block diagram showing a concrete formation of the middle value detecting circuit 10.

The outputs of the amplifiers 11 and 12 are given respectively to input terminals 91 and 92. The output of the inverting amplifier 7 is given to an input terminal 93. A maximum value circuit (mentioned as an MAX hereinafter) 94 determines the maximum value of the signals input through the input terminals 91 and 93. An MAX 96 determines the maximum value of the signals input through the input terminals 91 and 92. A minimum value circuit (mentioned as an MIN hereinafter) 97 determines the minimum value of the outputs of the MAX's 94, 95 and 96. Thereby, the middle value of the signals input into the input terminals 91, 92 and 93 is output from the MIN 97. By the way, the MAX and MIN may be replaced with each other.

Thus, the middle value of the outputs of the amplifiers 11 and 12 and inverting amplifier 7 is detected. The output signals of the amplifiers 11 and 12 and inverting amplifier 7 are of the same phase on the carrier color signal component of the same horizontal period. Therefore, a middle value signal h containing the carrier color signal component will be output from the middle value detecting circuit 10. Also, the luminance signal component will be contained in the middle value signal only in the period when the luminance signal component is contained in any of the outputs of the amplifiers 11 and 12 and inverting amplifier 7.

The outputs of the amplifier 11 and inverting amplifier 7 are input into an adder 8, are added together and are given as an added signal g to a middle value detecting circuit 15 through an amplifier 13. Also, the outputs of the inverting amplifier 7 and amplifier 12 are input into an adder 9, are added together and are output as an added signal i to a middle value detecting circuit 15 through an amplifier 14. The middle value detecting circuit 15 is also of the same formation as of the middle value detecting circuit 10 and detects the middle value of the middle value signal h from the middle value detecting circuit 10 and the added signals g and i. As the outputs of the amplifier 12 and inverting amplifier 7 are of the phases reverse to each other in the luminance signal component in the same horizontal period, the luminance signal component will not be contained in the added signal g in the period when the luminance signal is contained in any of the outputs of the amplifiers 11 and 12 and inverting amplifier 7. Also, in the same manner, the luminance signal component will not be contained in the added signal i in this period. Therefore, the luminance signal component of the middle value signal h will be deleted by the middle value detecting circuit 15 and the middle value signal j output to the output terminal 18 from the middle value detecting circuit 15 will be a carrier color signal containing no luminance signal component.

The adder 16 adds together the middle value signal j and the output of the 1H delaying circuit 2. As the phases of the carrier color signals of both are reverse to each other, no carrier color signal component will be contained in the output signal 1 from the adder 16. Thus the luminance signal is led out of the output terminal 17. Thus, the luminance signal and color signal will be positively separated from each other and a picture comparatively high in the resolution even in the vertical direction will be able to be obtained.

Further, the circuit of FIG. 13 shall be explained as divided into the operations of a horizontal filter and vertical filter. The horizontal filter is formed of the BPF's 4, 5 and 6. An input composite video signal first has the color signal component in the horizontal direction extracted by this horizontal filter. On the other hand, a three-line dynamic comb filter (mentioned as a DCF hereinafter) circuit is adopted as a vertical filter. In FIG. 13, the DCF circuit is formed of the 1H delaying circuits 2 and 3 and a one-point chain line part 19. After the color signal component in the horizontal direction is extracted by the horizontal filter, the color signal component j in the vertical direction is extracted by the DCF circuit. Then, the luminance signal 1 is obtained by subtracting the thus obtained color signal j from the input composite video signal. By the way, the center frequency ($f_{sc}$) of the color signal is given by the below mentioned formula (1) in the two-dimensional frequency expression:

$$\mu = 3.58 \text{ MHz}, \nu = 525/4 \text{cpH} \qquad (1)$$

wherein $\mu$ represents a horizontal frequency and $\nu$ represents a vertical frequency.

When the DCF circuit is adopted as a vertical filter, the dot obstruction generated in the part of a picture in which the color signal varies in the vertical direction will be able to be reduced. Thus, as compared with the case of using a comb filter utilizing the correlation between two horizontal lines, the precision of separating a luminance signal and color signal from each other in a vertical non-correlated part (mentioned as a Y/C separation precision hereinafter) can be improved to be higher.

However, there has been a problem that, as the oblique component of the luminance signal can not be judged, in a video image containing many oblique components, the Y/C separation will not be positively made and a cross color will be produced. This problem shall be explained with reference to the below mentioned Tables 1 and 2 and the explanatory view in FIG. 14. Color signals are sampled with sampling frequencies of 2 $f_{sc}$ and color signal amplitudes at the respective sampling points are normalized and are shown in Table 1.

TABLE 1

| | | | | | | | | | |
|---|---|---|---|---|---|---|---|---|---|
| Present signal | −1 | 1 | −1 | 1 | −1 | 1 | −1 | 1 | −1 |
| 1H delayed signal | 1 | −1 | 1 | −1 | 1 | −1 | 1 | −1 | 1 |
| 2H delayed signal | −1 | 1 | −1 | 1 | −1 | 1 | −1 | 1 | −1 |
| Color signal j | −1 | 1 | −1 | 1 | −1 | 1 | −1 | 1 | −1 |

TABLE 2

| | | | | | | | |
|---|---|---|---|---|---|---|---|
| Present signal d | 0 | 0 | 0 | −1 | 1 | 0 | 0 |
| 1H delayed signal e | 0 | 0 | 1 | −1 | 0 | 0 | 0 |
| 2H delayed signal f | 0 | −1 | 1 | 0 | 0 | 0 | 0 |
| Middle value output h | 0 | 0 | 1 | −1 | 0 | 0 | 0 |
| Adder 9 output i | 0 | 0 | 1 | −1 | 1 | 0 | 0 |
| Adder 8 output g | 0 | −1 | 1 | −1 | 0 | 0 | 0 |
| Color signal j | 0 | 0 | 1 | −1 | 0 | 0 | 0 |

As the color signal frequency is sufficiently higher than the horizontal frequency, the normalized color signal amplitude can be all considered to be 1. As shown in Table 1, the color signal is inverted in the phase before and after 1H.

Now, if the operation mid (A, B, C) is defined to be an operation to determine the middle value of A, B and C, the output h of the middle value detecting circuit 10 will be able to be represented by the below mentioned formula (2):

$$h = \text{mid}(d, e', f) \quad (2)$$

wherein e′ represents an inverted signal of the signal e. The color signal j from the middle value detecting circuit 15 can be represented by the below mentioned formula (3):

$$j = \text{mid}(h, (d+e')/2, (e'+f)/2) \quad (3).$$

The color signal j in case it is input is determined by applying this formula (3) to the above mentioned Table 1. The signal e is made by inverting the 1H delayed signal in Table 1. The same output as of the present signal is obtained from the middle value detecting circuit 10. Further, the same color signal j as the present signal is obtained also from the middle value detecting circuit 15.

Figure 14:
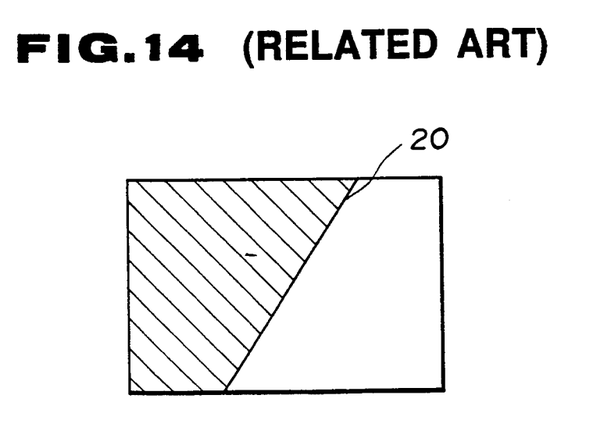
FIG. 14 is an explanatory view for explaining the problems of the conventional example.
Figure 15:
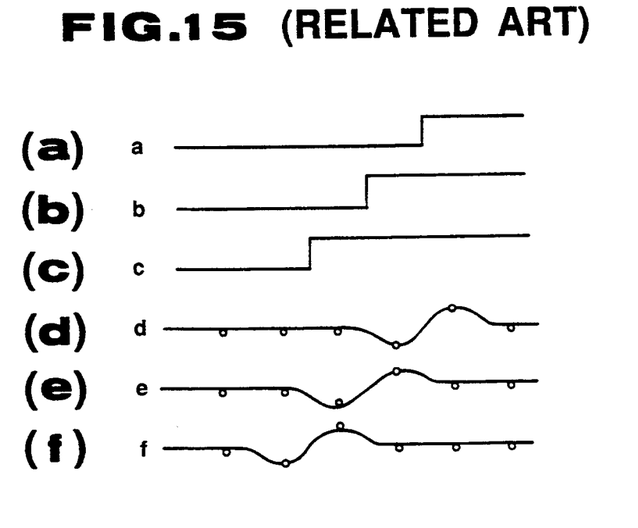
FIG. 15 is a waveform view for explaining the problems of the conventional example.

On the other hand, a black and white video signal having an oblique luminance component is assumed to be input through the input terminal 1. FIG. 14 shows a picture in which an image having such oblique component is displayed and the boundary between the black part (hatched part) and white part is sectioned by an oblique right rising varying line 20. FIGS. 15(a) to (f) are waveform views showing respectively the signals a to f in FIG. 13 in case the video signals in FIG. 14 are input. The above mentioned Table 2 shows signals d, e, f, h, i, g and j of respective parts in case the video signals in FIG. 14 are input as sampled by a sampling frequency of 2 $f_{sc}$ and having had the amplitude normalized.

As shown in FIGS. 15(a) to (c), the video signals of predetermined three lines lag by a predetermined period in the timing varying from a black level to a white level in response to the inclination of the varying line 20. These signals a, b and c are limited in the band respectively by the BPF's 4, 5 and 6 so as to be converted to the signals of the amplitudes shown in FIGS. 15(d) to (f). By the way, the circle (○) marks in FIGS. 15(d) to (f) show sampling points for making the above mentioned Table 2.

These signals d, e and f are input into the middle value detecting circuit 10 to obtain the output h based on the above mentioned formula (2). The adders 8 and 9 output respectively the signals g and h in Table 2. The middle value detecting circuit 15 operates the above mentioned formula (3) and outputs the color signal j shown in Table 2. As shown in Table 2, a part in which the amplitude is not 0 is generated in the color signal j from the middle value detecting circuit 15. Thus, though the input video signal is black and white and essentially contains no color component, in case an oblique component is contained in the luminance signal, a color component will be output from the output terminal 18 and a cross color will be produced. For example, there has been a problem that such picture as of a neck tie of black and white oblique stripes is displayed with the addition of colors.

SUMMARY OF THE INVENTION

An object of the present invention is to provide a luminance signal-color signal separating circuit whereby, even in case an oblique component is contained, a luminance signal and color signal will be able to be positively separated from each other.

The luminance signal-color signal separating circuit of the present invention comprises a separating means separating a color signal component by at least one of horizontal and vertical filters from an input composite video signal, a sampling means sampling the above mentioned input composite video signal with a predetermined sampling frequency synchronized with a color subcarrier, an operating means obtaining an output color signal by operating as predetermined a composite video signal of a predetermined sampling point by this sampling means and an oblique sampling point different horizontally and vertically from this predetermined sampling point and a color signal component obtained by at least one of the above mentioned horizontal and vertical filters and an adding means obtaining a luminance signal by utilizing the output color signal from this operating means.

The other features and advantages of the present invention will become apparent enough with the following explanation.

DETAILED DESCRIPTION OF THE PREFERRED EMBODIMENTS

Figure 1:
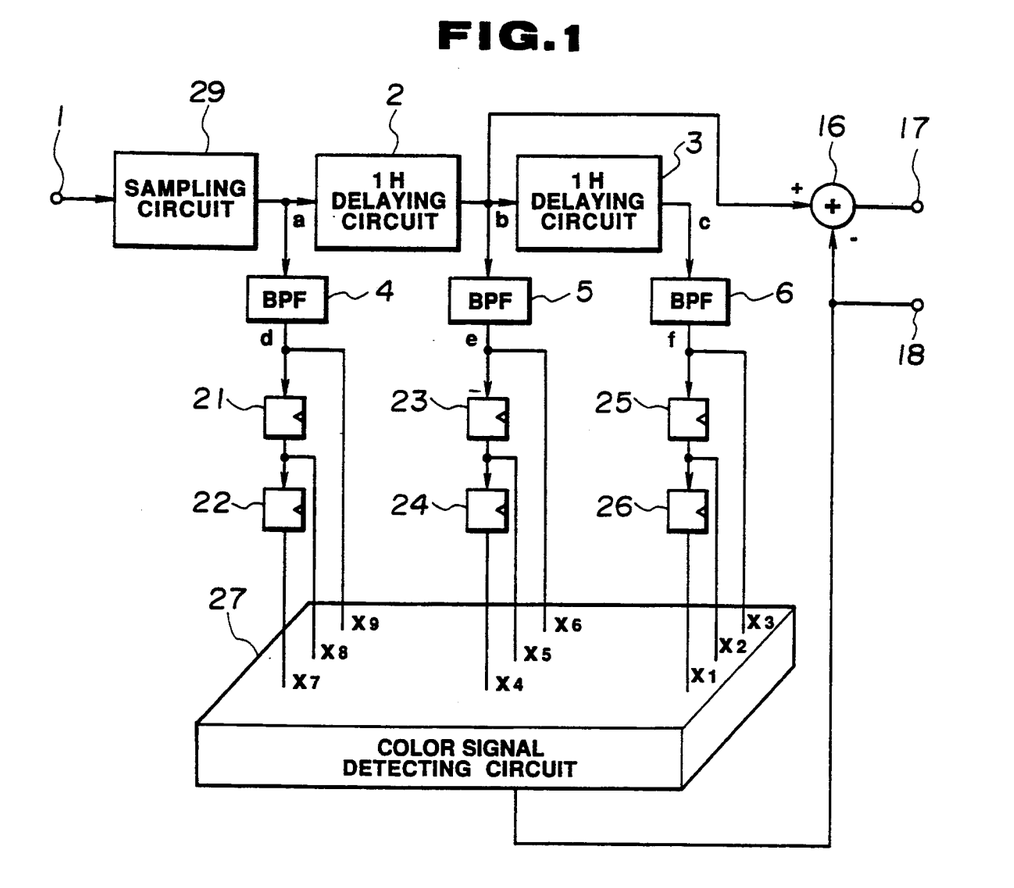
FIG. 1 is a block diagram showing an embodiment of a luminance signal-color signal separating circuit according to the present invention.

FIG. 1 is a block diagram showing an embodiment of a luminance signal-color signal separating circuit according to the present invention. In FIG. 1, the same components as in FIG. 13 shall bear the same reference numerals.

A composite video signal is input into an input terminal 1 and is given to a sampling circuit 29 which samples the input composite video signal with a predetermined sampling frequency synchronized with a color subcarrier and feeds it to a BPF 4 and 1H delaying circuit 2. This 1H delaying circuit 2 delays the composite video signal by 1H and gives it to a BPF 5, 1H delaying circuit 3 and adder 16. The 1H delaying circuit 3 delays by 1H the signal from the 1H delaying circuit 2 and gives it a BPF 6. Each of the BPF's 4, 5 and 6 has a frequency band (of 3.58 MH$_z$) near the color subcarrier frequency as a pass band and passes the carrier color signal and the luminance signal of the band of 3.58 MH$_z$ in the input composite video signal.

In this embodiment, the passed signal d (present signal) of the BPF 4 is given to a color signal detecting circuit 27 and is given also to the color signal detecting circuit 27 through a series circuit of unit delaying circuits 21 and 22. The unit delaying circuits 21 and 22 delay the input signal by a unit time and gives it to the color signal detecting circuit 27. Also, the passed signal e (1H delayed signal) of the BPF 5 is given to the color signal detecting circuit 27 and is given also to the color signal detecting circuit 27 through a series circuit of unit delaying circuits 23 and 24. The unit delaying circuits 23 and 24 delay the input signal by a unit time and give it to the color signal detecting circuit 27. Also, in the same manner, the passed signal f (2H delayed signal) of the BPF 6 is given to the color signal detecting circuit 27 and is given also to the color signal detecting circuit 27 through unit delaying circuits 25 and 26. The unit delaying circuits 25 and 26 delay the input signal by a unit time and give it to the color signal detecting circuit 27. Thereby, video signals x1 to x3, x4 to x6 and x7 to x9 respectively at three points on predetermined continued three lines are input into the color signal detecting circuit 27. The video signals at these respective three points are signals continued in the horizontal direction and located in the same positions in the horizontal direction on the picture. That is to say, the video signals at nine points of respectively three points adjacent vertically and horizontally on the picture are input at the same timing into the color signal detecting circuit 27.

In the color signal detecting circuit 27, as described later, the video signals at these nine points are operated as predetermined to judge the luminance oblique component and to positively extract only the color component.

Figure 2A:
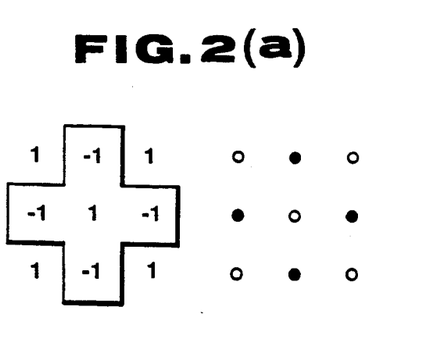
FIGS. 2(a) and 2(b) are explanatory diagrams for explaining the embodiment.
Figure 2B:
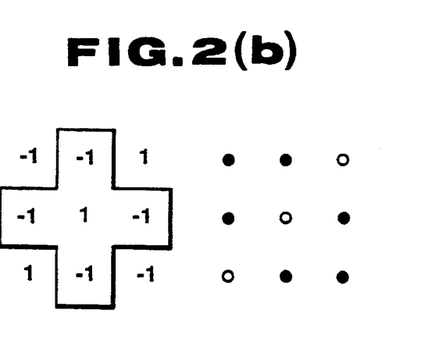

Now, the color signal component has been already separated by operating video signals sampled at three points adjacent horizontally and vertically to the predetermined sampling point, that is, at a total of five points. However, the luminance oblique component can not be judged at the horizontal and vertical five points. FIG. 2 is an explanatory diagram for explaining it. FIG. 2(a) shows color signals as sampled and normalized. FIG. 2(b) shows a white oblique line on a black ground as sampled and normalized.

As shown in FIGS. 2(a) and (b), at the vertical and horizontal five points (the part enclosed with the frame), the color signal and the white oblique line luminance signal are the same signals in the output of the BPF. Therefore, even if these five points are used, the color signal and luminance signal will not be able to be separated from each other. For this reason, in this embodiment, the video signals at nine points including the sampling points oblique to the noted sampling point are operated.

Figure 3:
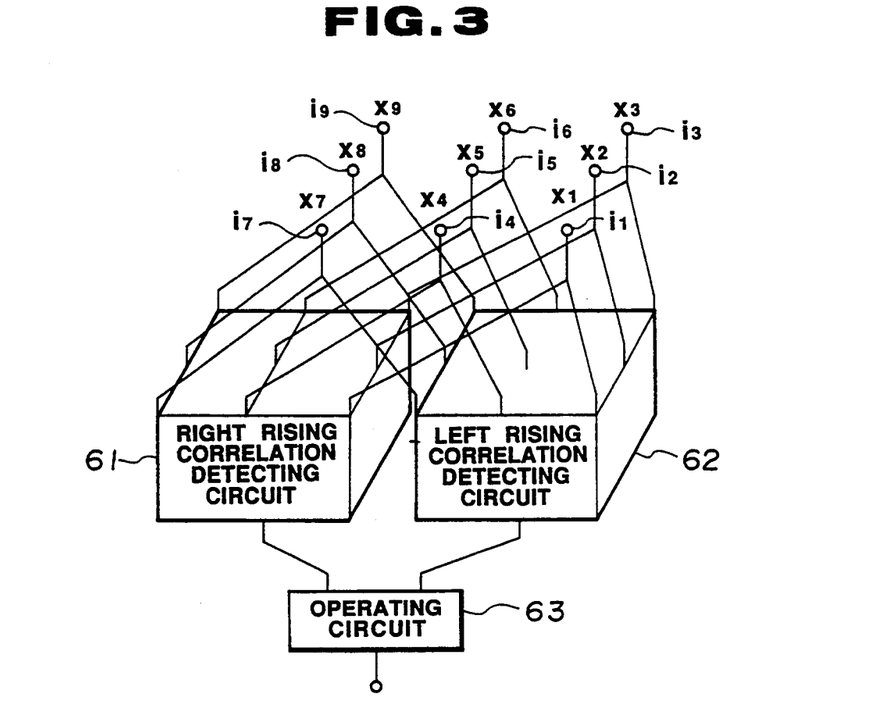
FIG. 3 is a block diagram showing a concrete formation of a color signal detecting circuit in FIG. 1.

FIG. 3 is a block diagram showing an oblique correlation detecting circuit 28 of a color signal detecting circuit 27 determining an oblique luminance component.

Video signals x1 to x9 are input respectively into input terminals i1 to i9. The color signal detecting circuit 27 comprises a right rising correlation detecting circuit 61 determining right rising correlations from the video signals x1 to x9 at these nine points, a left rising correlation detecting circuit 62 determining left rising correlations and an operating circuit 63 operating as predetermined the outputs of these correlation detecting circuits 61 and 62.

As evident from the above mentioned Table 1 showing the color signal component of horizontal three lines as sampled and normalized, in the color signal, the oblique component is all "1" or all "−1". That is to say, in the color signal, the right rising correlation and left rising correlation substantially coincide with each other. On the other hand, as evident from the above mentioned Table 2, in the luminance signal having an oblique component, near the oblique line, the difference between the right rising correlation and left rising correlation is comparatively large.

The luminance oblique component can be judged by thus determining the difference between the right rising correlation and left rising correlation. The operating circuit 63 makes this judgment and makes a predetermined operation based on the judged result to output a color signal having had the oblique luminance component removed.

Figure 4:
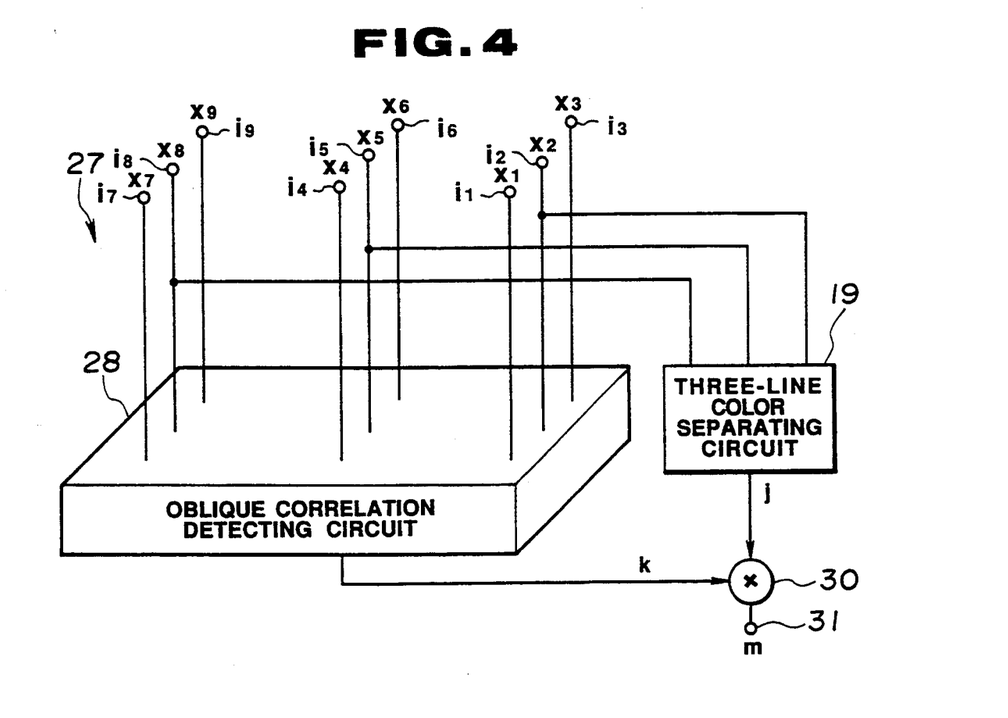
FIG. 4 is a block diagram showing a concrete formation of a color signal detecting circuit in FIG. 1.

FIG. 4 is a block diagram showing a concrete formation of the color signal detecting circuit 27 in FIG. 1.

The color signal detecting circuit 27 comprises the oblique correlation detecting circuit 28 shown in FIG.

3, a three-line color separating circuit 19 and a multiplier 30. The signals x1 to x9 are input respectively into the input terminals i1 to i9 of the oblique correlation detecting circuit 28. The signals x2, x5 and x8 are given also to the three-line color separating circuit 19 which is of the same formation as of the one-point chain line part 19 in FIG. 13. The color signal j is output by making the operations shown by the above mentioned formulae (2) and (3). By the way, the three-line color separating circuit 19 separates color signals on the signals x2, x5 and x8 but the operation may be made also on the other timing signals x1, x4 and x7 or signals x3, x6 and x9.

Figure 5:
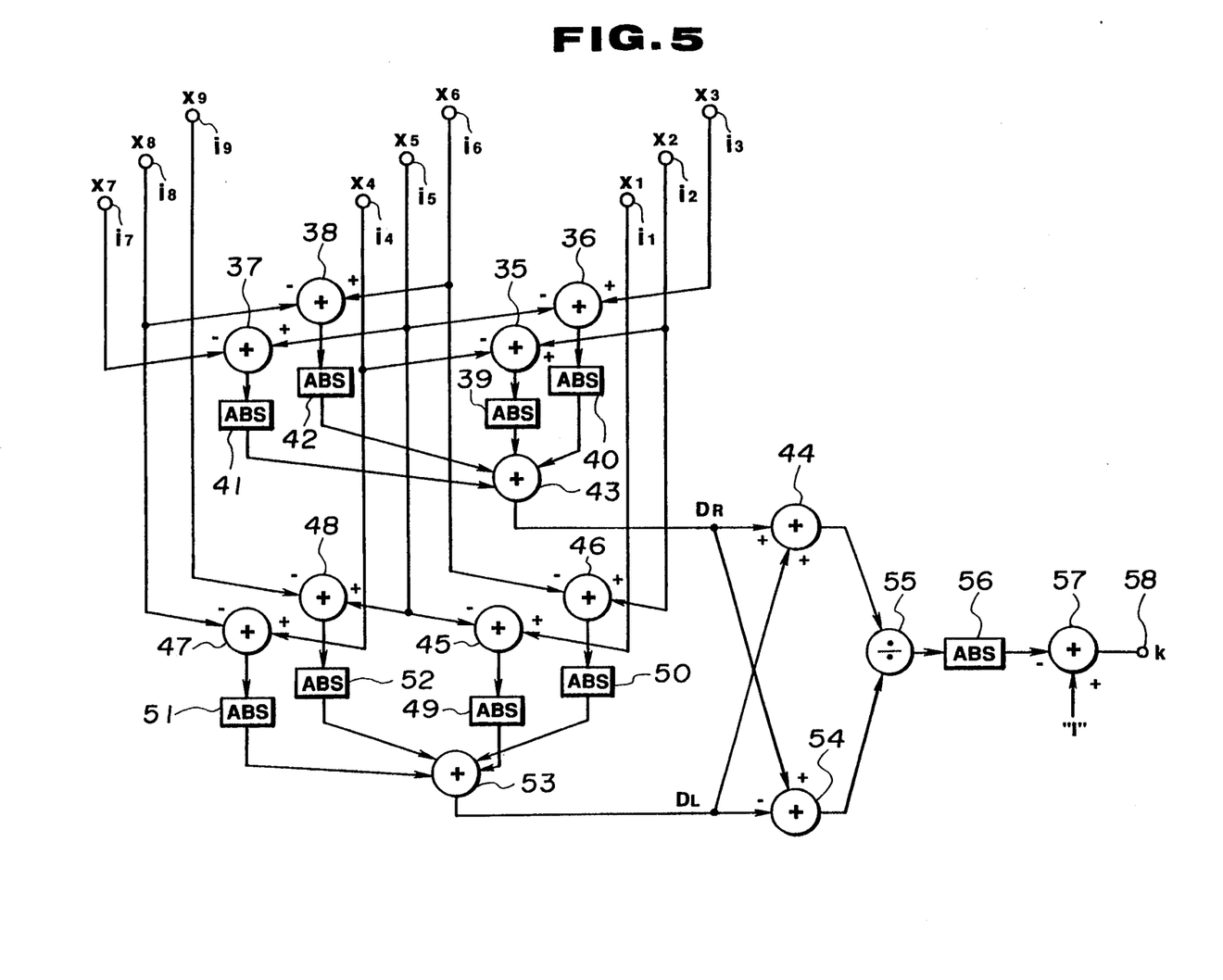
FIG. 5 is a circuit diagram showing a concrete formation of an oblique correlation detecting circuit in FIG. 4.

FIG. 5 is a circuit diagram showing a concrete formation of the oblique correlation detecting circuit 28 in FIG. 4.

The oblique correlation detecting circuit 28 is to determine the right rising correlation DR and left rising correlation DL for the signals x1 to x9 at nine points input respectively through the input terminals i1 to i9. That is to say, the adders 35 to 38 determine respectively the x2−x4, x3−x5, x5−x7 and x6−x8 to determine the right rising correlation DR. The outputs of the adders 36 to 38 are given to the adder 43 respectively through absolute value circuits (mentioned as ABS's hereinafter) 39 to 42. The adder 43 adds the outputs of the ABS's 39 to 42, determines the right rising correlation DR and outputs it to the adder 44. That is to say, the right rising correlation DR in this embodiment is the addition of the differences between the right oblique components themselves among the video signals at the nine points and can be represented by the below mentioned formula (4):

$$DR = |x2-x4| + |x3-x5| + |x5-x7| + |x6-x8| \quad (4).$$

On the other hand, the adders 45 to 48 for determining the left rising correlation DL determine respectively x1−x5, x2−x6, x4−x8 and x5−x9. The outputs of the adders 45 to 48 are given to the adder 53 respectively through the ABS's 49 to 52. The adder 53 adds the outputs of the ABS's 49 to 52 to determine the left rising correlation DL and outputs it to the adders 54 and 44. That is to say, the left rising correlation DL in this embodiment is the addition of the differences between the left oblique components themselves among the video signals at nine points and can be represented by the below mentioned formula (5):

$$DL = |x2-x6| + |x1-x5| + |x5-x9| + |x4-x8| \quad (5).$$

The adder 44 adds the right rising correlation DR and left rising correlation DL together and outputs the sum to a divider 55. The adder 54 subtracts the left rising correlation DL from the right rising correlation DR and outputs the result to the divider 55. The divider 55 divides the outputs of the adders 44 and 54 and outputs the result to the adder 57 through the ABS 56. The adder 57 subtracts the output of the ABS 56 from "1" and outputs an output k to the output terminal 58. The output k shows the degree of the color signal component and can be represented by the below mentioned formula (6):

$$k = 1 - |(DL-DR)/(DL+DR)| \quad (6).$$

The output k of this formula (6) is based on the difference between the right oblique correlation and left oblique correlation.

In FIG. 4, the output of the three-line color separating circuit 19 is given to the multiplier 30 which multiplies the output of the three-line color separating circuit 19 by the output k of the oblique correlation detecting circuit 28 and outputs a color signal m to the output terminal 31.

Figure 6:
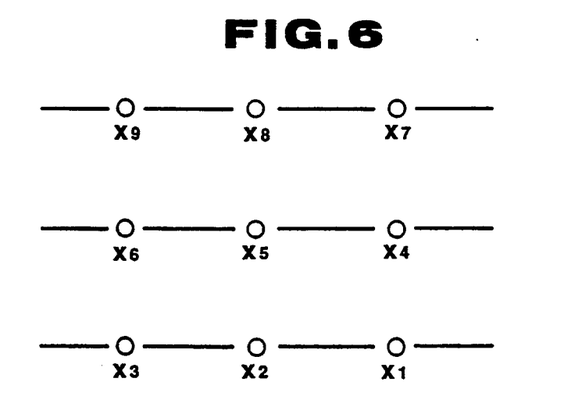
FIG. 6 is an explanatory diagram for explaining the operation of the embodiment.

The operation of the thus formed luminance signal-color signal separating circuit shall be explained in the following with reference to the Tables 3 and 4 and FIG. 6. The Table 3 shows the signals in the respective parts in case a color signal is input as sampled with a sampling frequency of 2 $f_{sc}$ and normalized. The Table 4 shows a luminance signal having an oblique component in the same manner.

TABLE 3

| Present signal d | −1 | 1 | −1 | 1 | −1 | 1 | −1 | 1 | −1 |
|---|---|---|---|---|---|---|---|---|---|
| 1H delayed signal e | 1 | −1 | 1 | −1 | 1 | −1 | 1 | −1 | 1 |
| 2H delayed signal f | −1 | 1 | −1 | 1 | −1 | 1 | −1 | 1 | −1 |
| Color signal j | −1 | 1 | −1 | 1 | −1 | 1 | −1 | 1 | −1 |
| Right rising correlation DR | 0 | 0 | 0 | 0 | 0 | 0 | 0 | 0 | 0 |
| Left rising correlation DL | 0 | 0 | 0 | 0 | 0 | 0 | 0 | 0 | 0 |
| Output k | 1 | 1 | 1 | 1 | 1 | 1 | 1 | 1 | 1 |
| Output color signal m | −1 | 1 | −1 | 1 | −1 | 1 | −1 | 1 | −1 |

TABLE 4

| Present signal a | 0 | 0 | 0 | 0 | 1 | 1 | 1 |
|---|---|---|---|---|---|---|---|
| 1H delayed signal b | 0 | 0 | 0 | 1 | 1 | 1 | 1 |
| 2H delayed signal c | 0 | 0 | 1 | 1 | 1 | 1 | 1 |
| Present signal d | 0 | 0 | 0 | 1 | −1 | 0 | 0 |
| 1H delayed signal e | 0 | 0 | 1 | −1 | 0 | 0 | 0 |
| 2H delayed signal f | 0 | 1 | −1 | 0 | 0 | 0 | 0 |
| Color signal j | 0 | 0 | −1 | 1 | 0 | 0 | 0 |
| Right rising correlation DR | 0 | 0 | 0 | 0 | 0 | 0 | 0 |
| Left rising correlation DL | 1 | 3 | 4 | 4 | 3 | 1 | 0 |
| Output k | 0 | 0 | 0 | 0 | 0 | 0 | 0 |
| Output color signal m | 0 | 0 | 0 | 0 | 0 | 0 | 0 |

The composite video signal input through the input terminal 1 is sampled with a sampling frequency synchronized with a color subcarrier by the sampling circuit 29 and is then delayed by the 1H delaying circuits 2 and 3. Thus, the present signal a, 1H delayed signal b and 2H delayed signal c are given respectively to the BPF's 4, 5 and 6. The signals d, e and f having passed respectively through the BPF's 4, 5 and 6 are given respectively to the input terminals i3, i6 and i9 of the color signal detecting circuit 27, are delayed by a unit time respectively by the unit time delaying circuits 21, 23 and 25 and are given respectively to the input terminals i2, i5 and i8. The outputs of the unit time delaying circuits 21, 23 and 25 are delayed by a unit time respectively by the unit delaying circuits 22, 24 and 26 and are given respectively to the input terminals i1, i4 and i7. By the 1H delaying circuits 2 and 3, as shown in FIG. 6, continued three-line video signals are simultaneously given to the color signal detecting circuit 27 and, by the unit delaying circuits 21 to 26, as shown in FIG. 6, the continued three-point video signals sampled with a sampling frequency of 2 $f_{sc}$ are given to the color signal detecting circuit 27. Thus, the signals x1 to x9 at nine points of three points each continued vertically and horizontally are input respectively into the input terminals i1 to i9 of the oblique correlation detecting circuit 28 (See FIG. 6).

On these signals x1 to x9, the oblique correlation detecting circuit 28 determines the right rising correlation DR and left rising correlation DL. That is to say, the above mentioned formula (4) is operated by the adders 35 to 38, ABS's 39 to 42 and adder 43 in FIG. 5 to determine the right rising correlation DR. Also, the above mentioned formula (5) is operated by the adders 45 to 48, ABS's 49 to 52 and adder 53 to determine the left rising correlation DL. Further, these right rising correlation DR and left rising correlation DL are given to the adders 44 and 54 to add and subtract them to and from each other. The outputs of the adders 44 and 54 are given to the divider 55 to determine the ratio of the subtraction result to the addition result. Further, the output of the divider 55 is given to the ABS circuit 56 to determine the absolute value. The output of the ABS circuit 56 is subtracted from 1 by the adding part 57. Thus, the output k of the above mentioned formula (6) is obtained at the output terminal 58.

The larger the difference between the right rising correlation DR and left rising correlation DL, the nearer to 0 the value of this output k. In case k=0, it will be shown that no color component is contained near the oblique varying line, that is, the video signal is of only the luminance component.

Now, a color signal is assumed to be input into the input terminal 1. In this case, the outputs of the BPF's 4, 5 and 6 will be inverted in the phase before and after 1H as shown in the above mentioned Table 3 and the absolute value of the normalized amplitude will be all about 1. Therefore, when the above mentioned formula (4) is operated for these present signal d, 1H delaying signal e and 2H delaying signal f, the right rising correlation DR will be 0 in all the timing as shown in the Table 3. Also, in the same manner, the left rising correlation DL determined by the operation of the above mentioned formula (5) will be 0 in all the timing. When the above mentioned formula (6) is further operated, as shown in the Table 3, the output k will be 1 in all the timing.

The multiplier 30 multiplies the color signal j from the three-line color separating circuit 19 by this output k. Thus, the color signal will be accurately reproduced as shown in the Table 3 at the output terminal 31.

On the other hand, as shown in the above mentioned Table 4, a luminance signal containing an oblique component is assumed to be input into the input terminal 1. When this luminance signal passes through the BPF's 4, 5 and 6, the present signal d, 1H delayed signal e and 2H delayed signal f shown in the above mentioned Table 4 will be obtained. By operating the above mentioned formulae (4) and (5) for these signals, the right rising correlation DR and left rising correlation DL are determined. Further, the output k is determined by operating the above mentioned formula (6). Then, as shown in the Table 4, the output k will be 0 in all the timing.

On the other hand, the three-line color separating circuit 19 determines the color signal j by the operation of the above mentioned formulae (2) and (3). In this color signal j, as described above, a cross color is produced by the oblique luminance component (the third and fourth sampling points from the left in Table 4). However, when the color signal j is multiplied by the output k in the multiplier 30, as shown in the Table 4, the output color signal m will be 0 in all the timing. Thus, even if the luminance signal containing an oblique component is input, the cross color will be prevented from being produced.

Thus, in this embodiment, by utilizing the video signals at nine points adjacent vertically and horizontally, the right rising correlation DR and left rising correlation DL are determined. From the difference between them, the luminance component is judged and the output k showing the degree of the color signal is determined. By varying the ratio of the color component to the luminance component in response to this k, the oblique component of the luminance signal is prevented from appearing in the color signal output. Thus, the positive Y/C separation is possible. Even in case a video signal having an oblique picture is input, a cross color will be prevented from being produced.

By the way, in order to determine such oblique correlations as the right rising correlation DR and left rising correlation DL, the vertical and horizontal nine points are not always necessary. For example, by utilizing oblique four points, they can be determined. In such case, by carrying out the operations shown in the below mentioned formulae (7) and (8) in the oblique correlation detecting circuit, the right rising correlation DR and left rising correlation DL may be determined;

$$DR = |x3 - x5| + |x5 - x7| \qquad (7)$$

$$DL = |x1 - x5| + |x5 - x9| \qquad (8).$$

By the way, even in this case, the other algorisms than the operations of the above mentioned formulae (7) and (8) will be the same. Therefore, it is desirable to use nine points by considering the performance. Also, it is possible to utilize, for example, a total of 25 points of 5 points each vertically and horizontally. However, the horizontal or vertical correlation detection is so difficult at five points as to be unable to be said to be effective. The above mentioned embodiment has been explained on the case of two dimensions but can be applied also to three dimensions utilizing, for example, (3×3×3) points.

Figure 7:
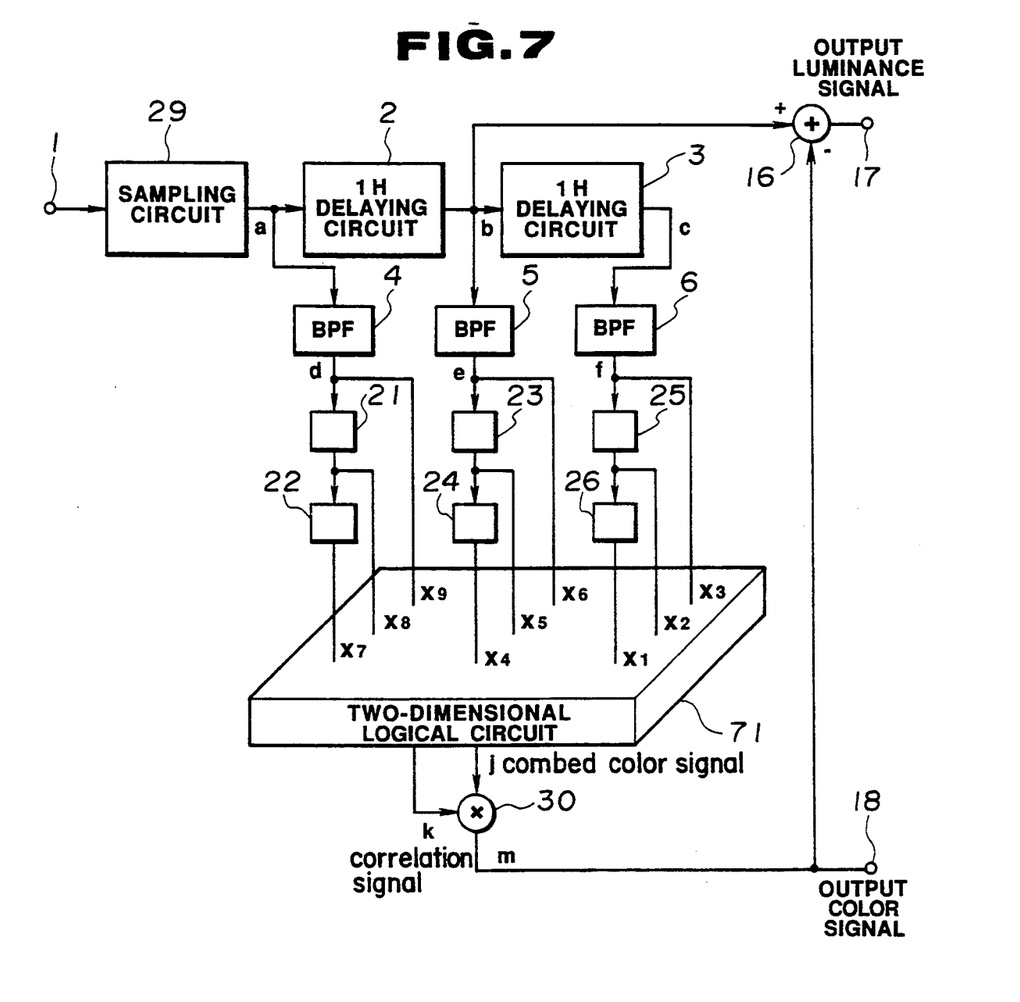
FIG. 7 is a block diagram showing another embodiment of the present invention.

FIG. 7 is a block diagram showing another embodiment of the present invention. In FIG. 7, the same components as in FIGS. 1 and 4 shall bear the same reference numerals and shall not be explained here.

The signals x1 to x9 from the BPF's 4, 5 and 6 and unit delaying circuits 21 to 26 are input into a two-dimensional logical circuit 71 which has an oblique correlation detecting circuit and three-line color separating circuit. This oblique correlation detecting circuit detects the right rising correlation DR and left rising correlation DL by an algorism different from the oblique correlation detecting circuit 28 in FIG. 4. That is to say, the two-dimensional logical circuit 71 determines the oblique correlations DR and DL by the operations shown by the below mentioned formulae (9) and (10):

$$DR = (x3 + x7)/2 - x5 \quad (9)$$

$$DL = (x1 + x9)/2 - x5 \quad (10)$$

The two-dimensional logical circuit obtains the output k showing the degree of the color by the operation shown in the below mentioned formula (11) from these oblique correlations DR and DT:

$$k = 1 - KT |DL - DR| \quad (11)$$

wherein KT represents a proportion constant.

The three-line color separating circuit of the two-dimensional logical circuit 71 is of the same formation as of the one-point chain line part in FIG. 13 and outputs the color signal j. The color signal j and output k from the two-dimensional logical circuit 71 are given to the multiplier 30 which determines the output color signal m by multiplying the color signal j by the output k and outputs it to the output terminal 18.

Figure 8A:
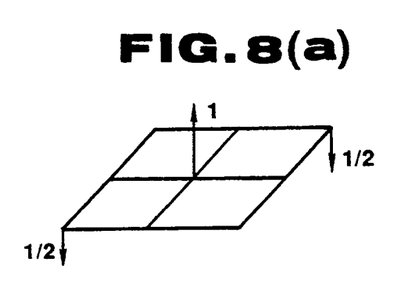
FIG. 8(a) and 8(b) is an explanatory diagram for explaining the operation of the embodiment in FIG. 7.
Figure 8B:
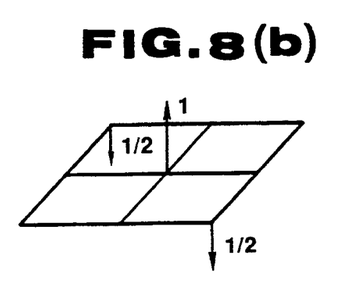

The operation of the thus formed embodiment shall be explained in the following with reference to the explanatory diagrams in FIG. 8 which shows the position of a signal by the intersection of respective straight lines and shows normalized signal levels by arrows.

Now, it is assumed that a color signal is input into the input terminal 1. In this case, the present signal d, 1H delayed signal e and 2H delayed signal f which are respective outputs from the BPF's 4, 5 and 6 will be able to be shown in the below mentioned Table 5. These signals are delayed by the unit delaying circuit 21 to 26 and vertical and horizontal nine-point signals x1 to x9 are given to the two dimensional logical circuit 71.

TABLE 5

| | | | | | | | | | |
|---|---|---|---|---|---|---|---|---|---|
| Present signal d | −1 | 1 | −1 | 1 | −1 | 1 | −1 | 1 | −1 |
| 1H delayed signal e | 1 | −1 | 1 | −1 | 1 | −1 | 1 | −1 | 1 |
| 2H delayed signal f | −1 | 1 | −1 | 1 | −1 | 1 | −1 | 1 | −1 |
| Color signal j | −1 | 1 | −1 | 1 | −1 | 1 | −1 | 1 | −1 |
| Right rising correlation DR | 0 | 0 | 0 | 0 | 0 | 0 | 0 | 0 | 0 |
| Left rising correlation DL | 0 | 0 | 0 | 0 | 0 | 0 | 0 | 0 | 0 |
| Output k | 1 | 1 | 1 | 1 | 1 | 1 | 1 | 1 | 1 |
| Output color signal m | −1 | 1 | −1 | 1 | −1 | 1 | −1 | 1 | −1 |

The two-dimensional logical circuit 71 separates and outputs the color signal j by the three-line color separating circuit and determines the right rising correlation DR and left rising correlation DL by the operations shown in the above mentioned formulae (9) and (10). The operation of the above mentioned formula (9) can be shown by FIG. 8(a). The absolute values of the color signal amplitudes at the respective sampling points are all 1. The color signal is inverted in the phase before and after 1H. Therefore, as evident from FIG. 8(a), the right rising correlation DR is 0. In the same manner, the operation of the above mentioned formula (10) can be shown by FIG. 8(b). As evident from this FIG. 8(b), the left rising correlation DL is also 0. Therefore, by the operation of the above mentioned formula (11), the output k becomes 1 in all the timing (See Table 5).

The multiplier 30 obtains the color signal m by multiplying the color signal j by the output k (=1). As shown in the Table 5, the color signal input into the color signal m appearing in the output terminal 18 is positively reproduced.

On the other hand, it is assumed that a luminance signal having an oblique component is input into the input terminal 1, In this case, the present signal d, 1H delayed signal e and 2H delayed signal f from the BPF's 4, 5 and 6 will be as shown in the below mentioned Table 6.

TABLE 6

| | | | | | | | |
|---|---|---|---|---|---|---|---|
| Present signal a | 0 | 0 | 0 | 0 | 1 | 1 | 1 |
| 1H delayed signal b | 0 | 0 | 0 | 1 | 1 | 1 | 1 |
| 2H delayed signal c | 0 | 0 | 1 | 1 | 1 | 1 | 1 |
| Present signal d | 0 | 0 | 0 | 1 | −1 | 0 | 0 |
| 1H delayed signal e | 0 | 0 | 1 | −1 | 0 | 0 | 0 |
| 2H delayed signal f | 0 | 1 | −1 | 0 | 0 | 0 | 0 |
| Color signal j | 0 | 0 | −1 | 1 | 0 | 0 | 0 |
| Output k | 0 | 0 | 0 | 0 | 0 | 0 | 0 |
| Output color signal m | 0 | 0 | 0 | 0 | 0 | 0 | 0 |

The two-dimensional logical circuit 71 determines the right rising correlation DR and left rising correlation DL by the operations shown in the above mentioned formulae (9) and (10) and further determines the output k in the respective timings by the operation shown in the above mentioned formula (11).

As shown in the Table 6, the output k is 0 in all the timing and the color signal m output from the multiplier 30 is 0. That is to say, the cross color component contained in the color signal j from the three-line color separating circuit is removed.

Thus, even in this embodiment, the same effect as in the embodiment in FIGS. 1 and 4 can be obtained.

Figure 9:
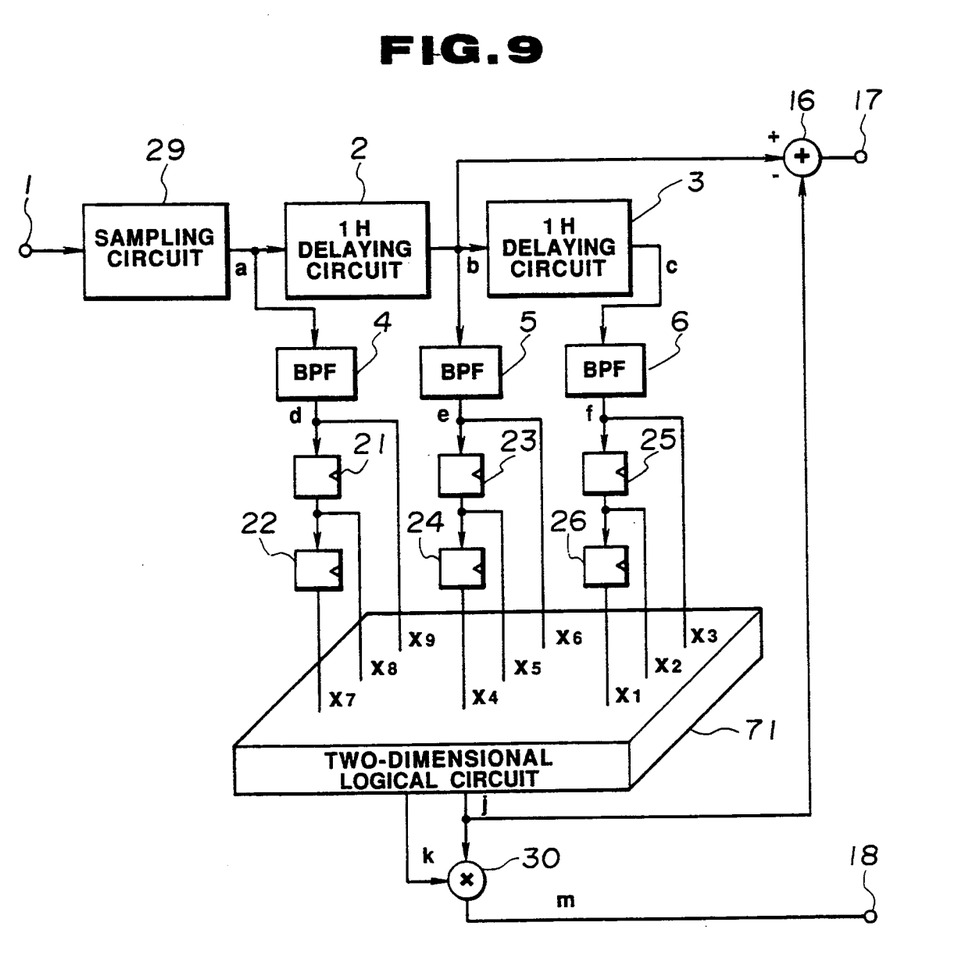
FIG. 9 is a block diagram showing another embodiment of the present invention.

FIG. 9 is a block diagram showing another embodiment of the present invention. In FIG. 9, the same components as in FIG. 7 shall bear the same reference numerals and shall not be explained here.

This embodiment is different from the embodiment in FIG. 7 in respect that the output of the three-line color separating circuit not illustrated of the two-dimensional logical circuit 71 is given to the adder 16.

In the thus formed embodiment, the operation of the two-dimensional logical circuit 71 and the operation of the multiplier 30 are the same as in the embodiment in FIG. 7 and the cross color component of the color signal m appearing in the output terminal 18 is removed.

On the other hand, as different from the embodiment in FIG. 7, the luminance signal is obtained by subtracting the color signal j from the composite video signal. That is to say, in this embodiment, without making the two-dimensional process, in the same manner as heretofore, with only the inter-line process, the luminance signal is obtained. Thereby, a luminance signal not subjected to the influence of the output k can be obtained and the luminance signal can be reproduced more accurately than in the embodiment in FIG. 7.

Figure 10:
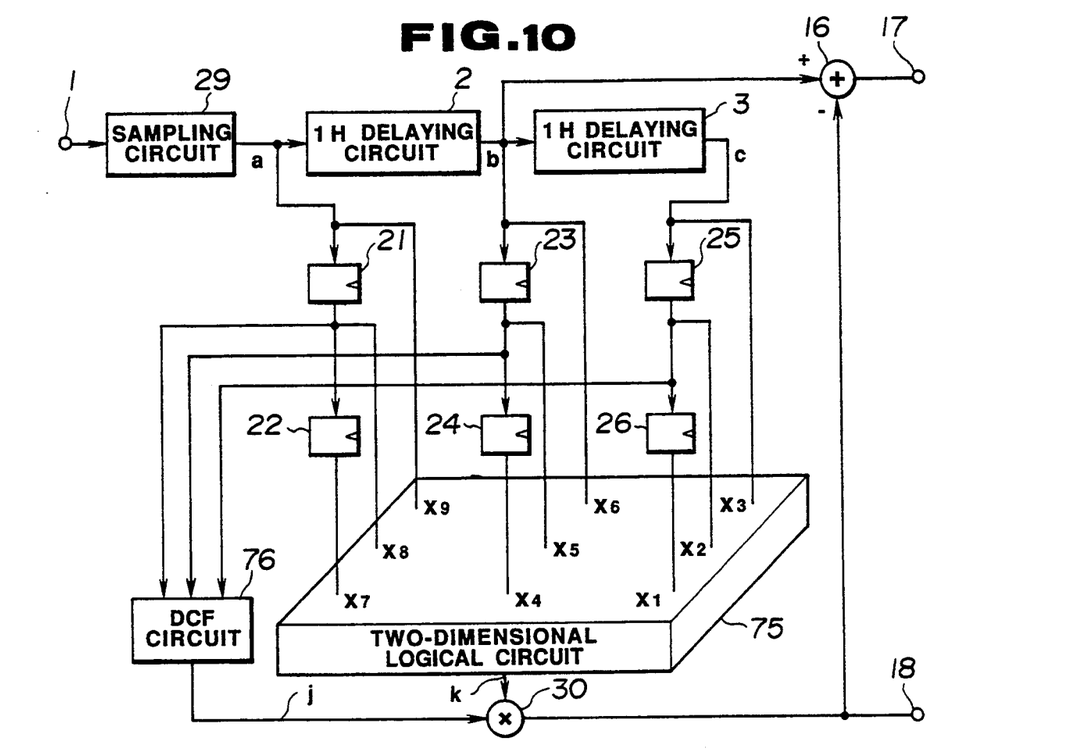
FIG. 10 is a block diagram showing another embodiment of the present invention.

FIG. 10 is a block diagram showing another embodiment of the present invention. In FIG. 10, the same components as in FIGS. 1 and 4 shall bear the same reference numerals and shall not be explained here.

In this embodiment, the present signal a, 1H delayed signal b and 2H delayed signal c are given respectively to the unit delaying circuits 21, 23 and 25 without passing through the BPF's. The outputs of the unit delaying circuits 21, 23 and 25 are given to the two-dimensional logical circuit 75 and also to the DCF circuit 76. The two-dimensional logical circuit 75 determines the right rising correlation DR and left rising correlation DL and obtains the output k showing the degree of the color component. The operations made by the two-dimensional logical circuit 75 can be shown by the below mentioned formulae (12), (13) and (14):

$$DR = (x2+x3+x6) - (x4+x7+x8) \quad (12)$$

$$DL = (x1+x2+x4) - (x6+x8+x9) \quad (13)$$

$$k = 1 - KT|(DL-DR)/(DL+DR)| \quad (14).$$

Figure 11:
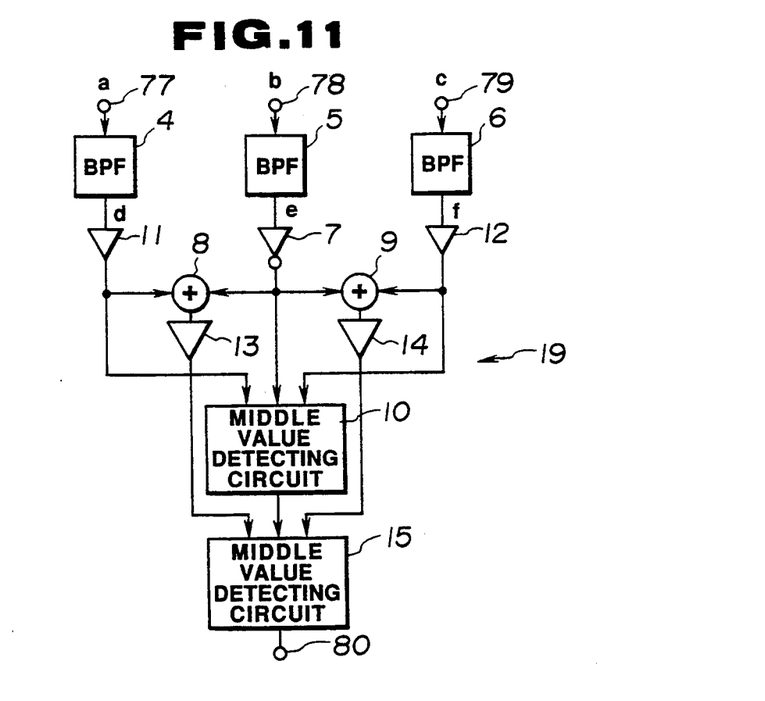
FIG. 11 is a block diagram showing a concrete formation of a DCF circuit in FIG. 10.

FIG. 11 is a block diagram showing a concrete formation of the DCF circuit 76 in FIG. 10. In FIG. 11, the same objects as in FIG. 13 shall bear the same reference numerals and shall not be explained here. The present signal a, 1H delayed signal b and 2H delayed signal c are input respectively into the input terminals 77 to 79 and are given respectively to the BPF's 4, 5 and 6. The present signal d, 1H delayed signal e and 2H delayed signal f from the BPF's 4, 5 and 6 are given to the three-line color signal separating circuit 19. That is to say, the DCF circuit 76 is of the same formation as in FIG. 13 and outputs the color signal j to the output terminal 80.

The operation of the thus formed embodiment shall be explained with reference to FIG. 12 which shows the position of the signal by the intersection of the respective straight lines and the normalized signal level by the arrow.

The two-dimensional logical circuit 75 determines the right rising correlation DR and left rising correlation DL by operating the above mentioned formulae (12) and (13) for the video signals x1 to x9 at nine points. The operation of the formula (12) can be shown by FIG. 12(a) and the operation of the formula (13) can be shown by FIG. 12(b).

Figure 12A:
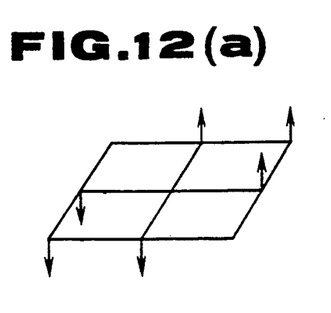
FIG. 12(a) and 12(b) is an explanatory diagram for explaining the operation of the embodiment in FIG. 10.
Figure 12B:
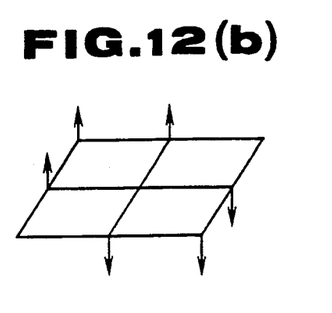

Of the color signals at the respective sampling points, the amplitudes at the arrows in FIGS. 12(a) and (b) are all 1. The color signal is inverted in the phase before and after 1H. Therefore, in the operations shown in FIGS. 12(a) and (b), both of the right rising correlation DR and left rising correlation DL are 0.

On the other hand, when a luminance signal containing an oblique component is input into the input terminal 1, the present signal d, 1H delayed signal e and 2H delayed signal f from the BPF's 4, 5 and 6 within the DCF circuit 76 will be as shown in the below mentioned Table 7. In this case, the color signal j containing the cross color components shown in the third and fourth sampling points from the left in the Table 7 will be output at the output terminal 80 of the DCF circuit 76. The two-dimensional logical circuit 75 operates the formulae (12) and (13) to determine the right rising correlation DR and left rising correlation DL shown in the Table 7. Further, the output k showing the degree of the color is determined by the operation of the above mentioned formula (14). As shown in the Table 7, the output k will be 0 in the period when the cross color component is contained in the color signal j. Therefore, the output of the multiplier 30 will be all 0 and the cross color component will be removed.

TABLE 7

| | | | | | | | |
|---|---|---|---|---|---|---|---|
| Present signal a | 0 | 0 | 0 | 0 | 1 | 1 | 1 |
| 1H delayed signal b | 0 | 0 | 0 | 1 | 1 | 1 | 1 |
| 2H delayed signal c | 0 | 0 | 1 | 1 | 1 | 1 | 1 |
| Present signal d | 0 | 0 | 0 | 1 | −1 | 0 | 0 |
| 1H delayed signal e | 0 | 0 | 1 | −1 | 0 | 0 | 0 |
| 2H delayed signal f | 0 | 1 | −1 | 0 | 0 | 0 | 0 |
| Color signal j | 0 | 0 | −1 | 1 | 0 | 0 | 0 |
| Right rising correlation DR | 0 | 0 | 0 | 0 | 0 | 0 | 0 |
| Left rising correlation $D_L$ | 0 | −1 | 1 | 1 | −1 | 0 | 0 |
| Output k | 1 | 0 | 0 | 0 | 0 | 1 | 1 |
| Output color signal m | 0 | 0 | 0 | 0 | 0 | 0 | 0 |

Thus, even in this embodiment, the same effects as in the other embodiments can be obtained.

It is apparent that, in the present invention, working modes different in a wide range can be formed on the basis of the present invention without deviating from the spirit and scope of the invention. The present invention is not restricted by its specific working mode except being limited by the appended claims.

What is claimed is:

1. A luminance signal-color signal separating circuit comprising:
    means for sampling an input composite video signal at a predetermined sampling frequency to generate a first composite image signal, where said predetermined sampling frequency is synchronized with a color subcarrier;
    filter and delay means, including horizontal and vertical filters, for generating more than one second composite image signal based on said first composite image signal, and for generating a color signal component corresponding to said input composite video signal, where said color signal component is generated based on a plurality of second composite image signals;
    operating means for determining a degree of color correlation within said input composite video signal based on said second composite image signals, and for producing an output color signal based on said color signal component and said degree of color correlation; and
    means for obtaining a luminance signal as a function of said output color signal.

2. A luminance signal-color signal separating circuit according to claim 1, wherein said operating means includes means for determining correlated results based on said second composite image signals, said correlated results being used to determine said degree of color correlation.

3. A luminance signal-color signal separating circuit according to claim 2, wherein said correlated results include a right oblique correlation and a left oblique correlation, and where said operating means further includes means for comparing said right and left oblique correlation and for generating said degree of color correlation based on said comparison.

4. A luminance signal-color signal separating circuit according to claim 2, wherein said operating means includes means for determining right oblique correlation and left oblique correlation, and for generating said degree of color correlation based on a deviation between said right and left oblique correlations.

5. A luminance signal-color signal separating circuit according to claim 1, wherein said operating means includes means for operating on said input composite video signal at a plurality of sampling points, where some of said sampling points are horizontal and vertical to a predetermined sampling point, and where other of said sampling points are different from the predetermined sampling point both horizontally and vertically.

6. A luminance signal-color signal separating circuit according to claim 1 wherein the horizontal filter has a band pass filter having a color subcarrier frequency band as a passing region.

7. A luminance signal-color signal separating circuit according to claim 1, wherein said color-signal component is based on second composite image signals which correspond to multiple lines from a same horizontal position within said input composite video signal.

* * * * *